United States Patent
Kolbe et al.

(10) Patent No.: US 11,187,200 B1
(45) Date of Patent: Nov. 30, 2021

(54) BRUSHLESS MOTOR STARTER BOX

(71) Applicants:Vincent Kolbe, Delmar, CA (US); John Cary, San Juan Capistrano, CA (US)

(72) Inventors: Vincent Kolbe, Delmar, CA (US); John Cary, San Juan Capistrano, CA (US)

( * ) Notice: Subject to any disclaimer, the term of this patent is extended or adjusted under 35 U.S.C. 154(b) by 0 days.

(21) Appl. No.: 16/950,581

(22) Filed: Nov. 17, 2020

(51) Int. Cl.
  *F02N 11/12* (2006.01)
  *B60G 17/015* (2006.01)
  *H02K 5/24* (2006.01)
  *H02K 5/22* (2006.01)

(52) U.S. Cl.
  CPC .......... *F02N 11/12* (2013.01); *B60G 17/0157* (2013.01); *H02K 5/225* (2013.01); *H02K 5/24* (2013.01)

(58) Field of Classification Search
  CPC ...... B60G 17/0157; H02K 5/225; H02K 5/24; F02N 11/12; F02N 15/08; F02N 2200/061; F02N 11/101; A63H 29/24; A63H 29/22; A63H 29/20
  See application file for complete search history.

(56) References Cited

U.S. PATENT DOCUMENTS

| | | | |
|---|---|---|---|
| 2,463,178 A * | 3/1949 | Hoover | F02N 11/12 74/8 |
| 3,471,963 A * | 10/1969 | Tomiyama | A63H 17/262 446/429 |
| 3,895,458 A * | 7/1975 | Lemelson | A63H 18/14 446/429 |
| RE30,299 E * | 6/1980 | Greenwood | A63H 17/26 446/233 |
| 4,274,292 A * | 6/1981 | Arnett, Jr. | F02N 7/08 123/179.31 |
| 4,363,186 A * | 12/1982 | Goldfarb | A63H 17/21 446/429 |

(Continued)

FOREIGN PATENT DOCUMENTS

| | | |
|---|---|---|
| EP | 1522450 A2 | 4/2005 |
| WO | 2000015455 A2 | 3/2000 |

(Continued)

*Primary Examiner* — Paul N Dickson
*Assistant Examiner* — Timothy Wilhelm
(74) *Attorney, Agent, or Firm* — David A. Belasco; Belasco Jacobs & Townsley, PC

(57) ABSTRACT

A starter box for small scale fuel powered vehicles includes a rigid container with two sets of mounting hardware on the top surface of the container. The mounting hardware engages suspension components of the vehicle. The starter box includes a drive wheel assembly connected to a brushless motor. The assembly includes a drive wheel with a frictional perimeter surface. The drive wheel extends partially through an opening in the top surface to engage a flywheel of the vehicle. Both sets of mounting hardware are horizontally movable to adapt to different vehicles. One set of mounting hardware is spring loaded and moves vertically when the vehicle is pressed downwardly to engage the drive wheel and a switch connecting the motor to a battery through an electronic speed control (ESC). The ESC is programmable to control the motor speed, acceleration, and latency of engagement while monitory the charge level of the battery.

18 Claims, 12 Drawing Sheets

(56) References Cited

U.S. PATENT DOCUMENTS

| | | | | |
|---|---|---|---|---|
| 4,498,886 | A * | 2/1985 | Goldfarb | A63H 29/20 446/202 |
| 4,526,554 | A * | 7/1985 | Goldfarb | A63H 17/21 446/429 |
| 4,556,396 | A * | 12/1985 | Kennedy | A63H 29/24 446/23 |
| 4,583,613 | A * | 4/1986 | Nakayama | B60K 31/02 123/198 DC |
| 4,631,434 | A | 12/1986 | Asaoka | |
| 5,091,679 | A | 2/1992 | Murty | |
| 5,141,467 | A * | 8/1992 | Crosbie | A63H 17/008 446/398 |
| 5,533,274 | A * | 7/1996 | Westling | F02N 11/12 33/600 |
| 5,549,501 | A * | 8/1996 | Jow | A63H 17/262 446/460 |
| 5,644,200 | A | 7/1997 | Yang | |
| 5,778,953 | A * | 7/1998 | Braddock | B23D 47/025 144/286.1 |
| 6,170,596 | B1 * | 1/2001 | Triarsi | B60K 20/06 180/291 |
| 6,620,022 | B1 * | 9/2003 | Smith | A63H 17/262 446/429 |
| 6,854,746 | B2 * | 2/2005 | Stolfus, II | F02N 15/06 180/54.1 |
| 7,331,320 | B2 * | 2/2008 | Asada | F02N 11/101 123/179.24 |
| 7,331,321 | B2 * | 2/2008 | Thompson | F02N 11/12 123/179.24 |
| 7,597,164 | B2 * | 10/2009 | Severinsky | B60H 1/3222 180/65.27 |
| 9,272,628 | B2 | 3/2016 | Harper | |
| 9,616,711 | B1 * | 4/2017 | Bills | B60K 7/0007 |
| 9,625,905 | B2 * | 4/2017 | Rosenberg | G05D 1/005 |
| 9,707,488 | B2 * | 7/2017 | Lennon | A63H 17/008 |
| 9,709,014 | B2 | 7/2017 | Puri | |
| 10,040,370 | B2 * | 8/2018 | Wei | H01M 10/058 |
| 10,167,015 | B2 * | 1/2019 | Rust | B62D 15/0215 |
| 2002/0189566 | A1 * | 12/2002 | Smalley, Jr. | F02N 15/025 123/179.26 |
| 2004/0012204 | A1 | 1/2004 | Walter | |
| 2004/0129481 | A1 * | 7/2004 | Stolfus | F02B 61/06 180/291 |
| 2008/0078348 | A1 * | 4/2008 | Lu | F02N 11/12 123/179.1 |
| 2011/0017529 | A1 | 1/2011 | Durney | |
| 2011/0126790 | A1 * | 6/2011 | Vacek | F02N 11/0803 123/179.28 |
| 2012/0329593 | A1 * | 12/2012 | Larrabee | F16H 3/72 475/5 |
| 2018/0309312 | A1 * | 10/2018 | King | H02J 9/066 |

FOREIGN PATENT DOCUMENTS

| | | |
|---|---|---|
| WO | 2011127389 A2 | 10/2011 |
| WO | 2015073084 A1 | 5/2015 |

* cited by examiner

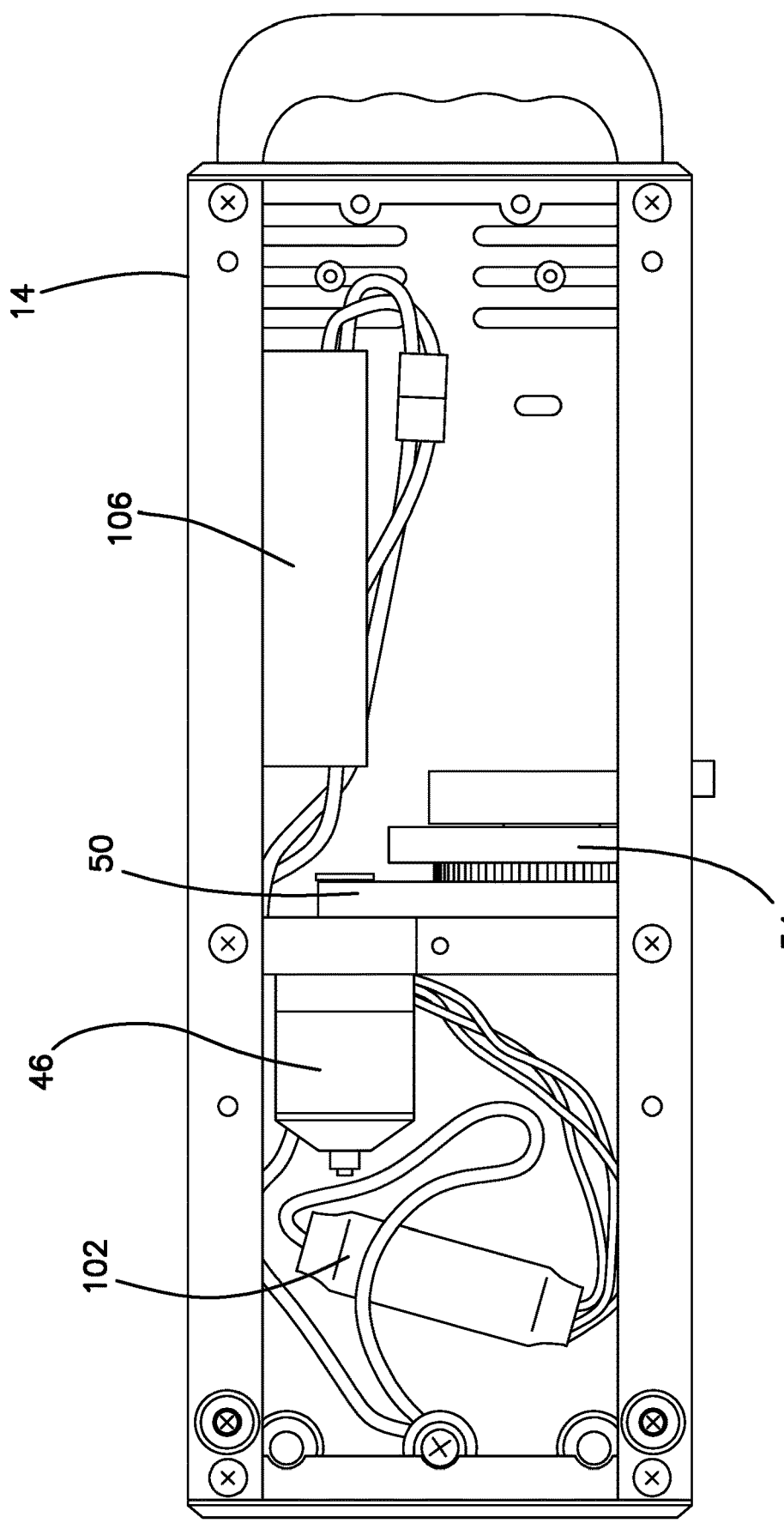

BRUSHLESS MOTOR STARTER BOX

FIELD OF INVENTION

This invention relates to the field of small scale racing and off-road fuel powered vehicles and more specifically to electrical starter boxes for use with such vehicles.

BACKGROUND OF THE INVENTION

Recreational use of small scale racing and off-road fuel powered vehicles has become very popular in recent years. These vehicles employ powerful, high-efficiency fuel powered engines, often using nitro-methane fuel. These engines are typically started with a device that spins a rubber drive wheel against the flywheel of the engine. In order to provide for easy engagement of the flywheel of the engine, special starter box device have been developed. These starter boxes include adjustable mounting hardware that allows a user to position the vehicle on the starter box so that the rubber drive wheel will be positioned against the flywheel of the engine without the need for careful adjustment. A pressure switch is typically employed to energize an electric motor powering the rubber drive wheel as downward pressure is applied to the vehicle.

Prior art technology starter boxes employ brushed electric motors to power the rubber drive wheel. No speed control is provided for the motor and no protection circuitry is provided for batteries powering the motor. The present invention employs a brushless DC motor to turn the rubber drive wheel and provides an electronic speed control (ESC) to vary current provided to the motor. This allows for control of the power application curve for the motor. The ESC also monitors the charge level of the batteries and prevents their use if excessively discharged. The ESC can also cut off application of power to the brushless motor if the batteries are overcharged. Further control of the brushless starter box motor is achieved through external control circuitry attached to the ESC.

Some examples of engine starting technology include the following. U.S. Pat. No. 7,597,164 issued to Severinsky et al. discloses an internal combustion engine for a hybrid vehicle, having a brushless DC-motor acting as a starter motor. The transfer of power from the battery to the starter motor is controlled by a semiconductor switch using pulse-width modulation, wherein the semiconductor is capable of conducting during certain portions of the power waveform.

U.S. Patent Application No. 2004/0012204, published for Walter et al., is directed to a starting system for an internal combustion engine of a vehicle, including a Permanent Magnet Generator (PMG). When in 'start-mode', the PMG receives power from a DC controller and is driven as a brushless DC motor for the purpose of starting the engine.

U.S. Pat. No. 5,644,200, issued to Yang discloses a driving structure for a vehicle that includes an electric machine coupled to the engine, wherein the electric machine functions as a starter motor for the engine in certain conditions. The machine is a brushless machine, and is further coupled to a drive controller, which operates to control the power supplied from the battery of the vehicle to the machine.

International Application No. WO2015073084, published for Koster describes a hybrid transmission system that may be used for racing or off-road vehicles. The system includes an electric motor, which may be a brushless motor, and is used as a starter for the engine in certain operative states.

European Application No. EP1522450, published for Louckes et al. discloses a drive system for a hybrid vehicle, having a traction motor and a starter motor, both being coupled to the internal combustion engine of the vehicle. The starter motor can be a brushless DC Motor. A controller is coupled to the two motors, and is programmed to control the power supplied to the traction motor and the starter motor. Further, semiconductor switches are disclosed, which control the transfer of power between the battery bank and the two motors using pulse-width modulation.

International Application No. WO2011127389, published for Larrabee describes a transmission system that may be used for off-road vehicles, including multi-wheeled land vehicles. The system includes an electric motor, which may be a brushless motor, and is used as a starter for the engine in certain operative states.

It is an objective of the present invention to provide a small scale vehicle starter box employing a brushless DC electrical motor. It is a further objective to provide a starter box having an electronic speed control connected to the brushless motor. It is a still further objective of the invention to provide means for modifying the curve of power application to the motor. It is yet a further objective to provide a starter box with circuitry to protect the device batteries from harm from under or overcharged conditions. Finally, it is an objective of the present invention to provide a starter box that is durable and inexpensive to produce.

While some of the objectives of the present invention are disclosed in the prior art, none of the inventions found include all of the requirements identified.

SUMMARY OF THE INVENTION

The present invention addresses all of the deficiencies of prior art starter box inventions and satisfies all of the objectives described above.

(1) A brushless motor starter box satisfying all of the stated objectives can be constructed from the following components. A rigid container is provided. The container has a top panel, a bottom panel, first and second side panels, first and second end panels. At least one brushless electrical motor is provided. The at least one motor is mounted to the container. A drive wheel assembly is provided. The drive wheel assembly is mounted in a fixed position with respect to the container and has a drive wheel. The drive wheel is mechanically connected to the motor and has frictional material located along an outer perimeter. The top panel has an opening. The opening is sized, shaped and located to permit a portion of the drive wheel to project through the opening.

A first set of positioning hardware is provided. The first set of positioning hardware is sized, shaped and located to engage chassis components adjacent a first end of a small scale road racing or off-road fuel powered vehicle. The first set of positioning hardware is adjustable in a horizontal plane so as to align an engine flywheel of the vehicle with the drive wheel.

A second set of positioning hardware is provided. The second set of positioning hardware is sized, shaped and located to engage chassis components adjacent a second end of the small scale road racing or off-road fuel powered vehicle. The second set of positioning hardware is adjustable in a horizontal plane so as to align an engine flywheel of the vehicle with the drive wheel. The second set of positioning hardware is movable in a vertical plane, is maintained in an upper position by at least one spring and is movable to a lower position when subject to pressure from above. The pressure causes the drive wheel to engage the flywheel.

A momentary switch is provided. The momentary switch is closed when the second set of positioning hardware is moved to the lower position. An electronic speed control (ESC) is provided. The ESC is located within the container and electrically connected to the motor and the momentary switch. A battery power source is provided. The power source is electrically connected directly or indirectly to the ESC and the momentary switch.

In operation, the small scale road racing or off-road fuel powered vehicle is placed on the top panel with the chassis components engaged with the first and second sets of positioning hardware. The vehicle is pressed downwardly causing the drive wheel to engage the vehicle flywheel. When the momentary switch is closed, the brushless motor will be activated by the power source and the drive wheel will cause the flywheel to turn, thereby starting an engine of the vehicle.

(2) In a variant of the invention, the brushless motor starter box further includes an on/off switch between the battery power source and the ESC.

(3) In another variant, the ESC can detect a low voltage condition in the battery power source and prevent further use of the battery.

(4) In still another variant, the ESC can measure voltage of the battery power source and discontinue operation if measured voltage is above a pre-determined maximum level.

(5) In yet another variant, the brushless motor starter box includes a low battery voltage indicator light.

(6) In a further variant, the brushless motor starter box includes an excessive battery voltage indicator light.

(7) In still a further variant, the brushless motor starter box includes a battery voltage indicator gauge.

(8) In yet a further variant, the ESC is programmable to permit the brushless motor to operate at selected amounts of throttle.

(9) In another variant of the invention, the selected amounts of throttle are selected from the group consisting of: 0% to 25%, 0% to 50%, 0% to 75%, and 0% to 100%.

(10) In still another variant, the ESC is programmable to permit the brushless motor to operate using selected throttle response curves.

(11) In yet another variant, the selected throttle response curves are selected from the group consisting of: linear, hyperbolic, asymptotic and exponential.

(12) In a further variant, wherein the ESC is programmed using an external control unit, the external control unit is connected to the ESC using a wired connection.

(13) In still a further variant, the ESC is programmed using an external control unit, the external control unit is connected to the ESC using a wireless connection.

(14) In yet a further variant, the ESC is programmable to permit the brushless motor to operate with a user-selected level of latency for delayed starting after activation of the momentary switch.

(15) In another variant of the invention, the ESC is programmable to reduce battery voltage found to be in excess of a pre-determined maximum level, thereby permitting continued operation of the brushless motor.

(16) In still another variant, the ESC is not programmable.

(17) In yet another variant, the brushless motor starter box includes a battery charging circuit and external power source connection.

(18) In a final variant, a brushed motor starter box can be constructed from the following components. A rigid container is provided. The container has a top panel, a bottom panel, first and second side panels, first and second end panels. At least one brushed electrical motor is provided. The at least one motor is mounted to the container. A drive wheel assembly is provided. The drive wheel assembly is mounted in a fixed position with respect to the container and has a drive wheel. The drive wheel is mechanically connected to the motor and has frictional material located along an outer perimeter. The top panel has an opening. The opening is sized, shaped and located to permit a portion of the drive wheel to project through the opening.

A first set of positioning hardware is provided. The first set of positioning hardware is sized, shaped and located to engage chassis components adjacent a first end of a small scale road racing or off-road fuel powered vehicle. The first set of positioning hardware is adjustable in a horizontal plane so as to align an engine flywheel of the vehicle with the drive wheel.

A second set of positioning hardware is provided. The second set of positioning hardware is sized, shaped and located to engage chassis components adjacent a second end of the small scale road racing or off-road fuel powered vehicle. The second set of positioning hardware is adjustable in a horizontal plane so as to align an engine flywheel of the vehicle with the drive wheel. The second set of positioning hardware is movable in a vertical plane, is maintained in an upper position by at least one spring and is movable to a lower position when subject to pressure from above. The pressure causes the drive wheel to engage the flywheel. A momentary switch is provided. The momentary switch is closed when the second set of positioning hardware is moved to the lower position. A battery power source is provided. The power source is electrically connected directly or indirectly to the brushed motor and the momentary switch. A battery charging circuit and external power source connection is provided. The battery charging circuit is connectable to the battery power source.

In operation, the small scale road racing or off-road fuel powered vehicle is placed on the top panel with the chassis components engaged with the first and second sets of positioning hardware. The vehicle is pressed downwardly causing the drive wheel to engage the vehicle flywheel. When the momentary switch is closed, the brushed motor will be activated by the power source and the drive wheel will cause the flywheel to turn, thereby starting an engine of the vehicle.

DESCRIPTION OF THE DRAWINGS

FIG. 5 is a bottom side elevational view of the FIG. 1 embodiment illustrating the placement of the brushless motor, drive wheel assembly, ESC and battery power source;

DETAILED DESCRIPTION OF THE PREFERRED EMBODIMENT (1) A brushless motor starter box 10 satisfying all of the stated objectives can be constructed from the following components. As illustrated in FIGS. 1-13, rigid container 14 is provided. The container 14 has a top panel 16, a bottom panel 18, first 22 and second 26 side panels and first 30 and second 34 end panels. At least one brushless electrical motor 46 is provided. The at least one motor 46 is mounted to the container 14. A drive wheel assembly 50 is provided. The drive wheel assembly 50 is mounted in a fixed position with respect to the container 14 and has a drive wheel 54. The drive wheel 54 is mechanically connected to the motor 46 and has frictional material 58 located along an outer perimeter 62. The top panel 16 has an opening 74. The opening 74 is sized, shaped and located to permit a portion of the drive wheel 54 to project through the opening 74.

Figure 1:
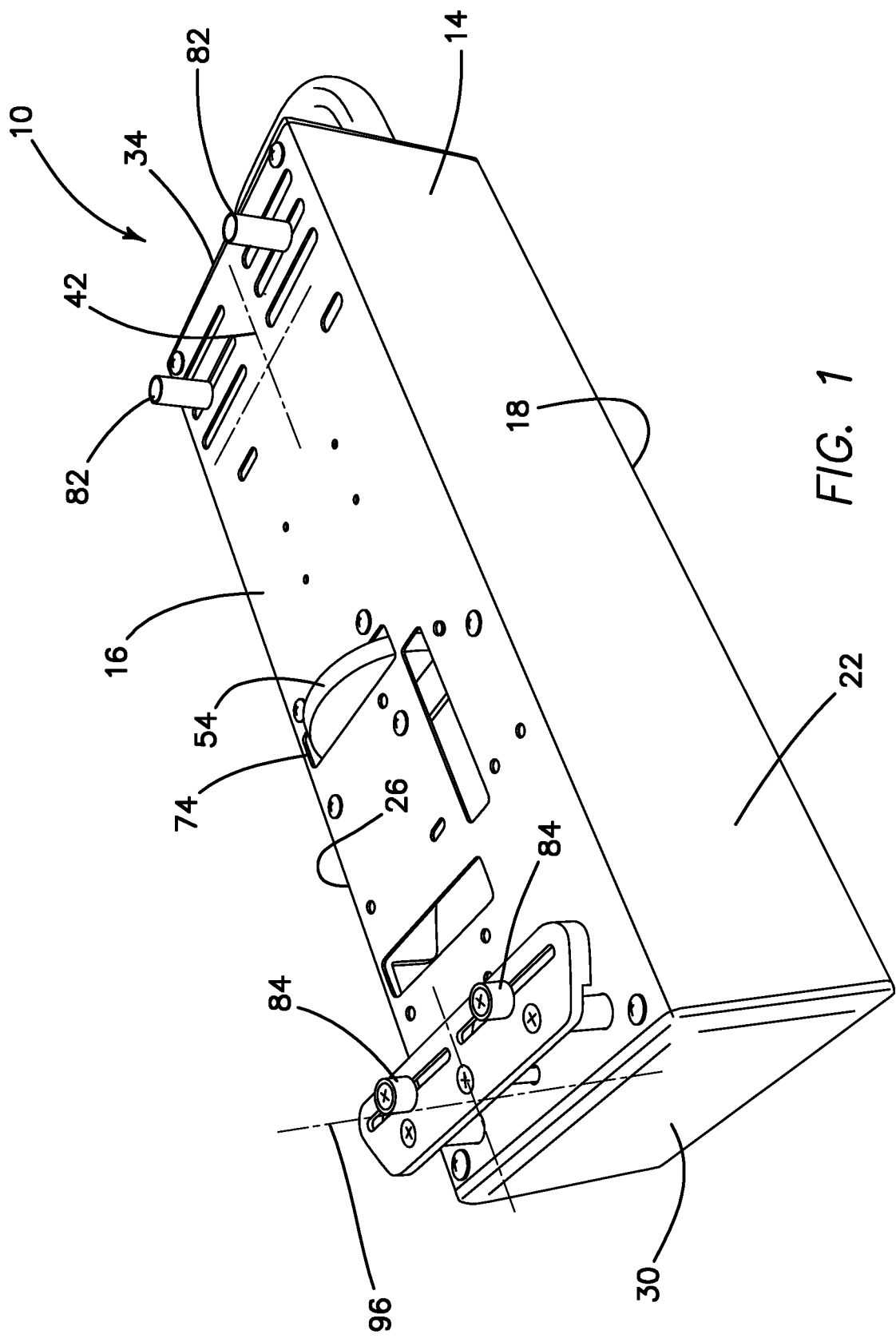
FIG. 1 is a top side perspective view of the preferred embodiment of the invention illustrating the top panel mounting hardware and drive wheel.
Figure 2:
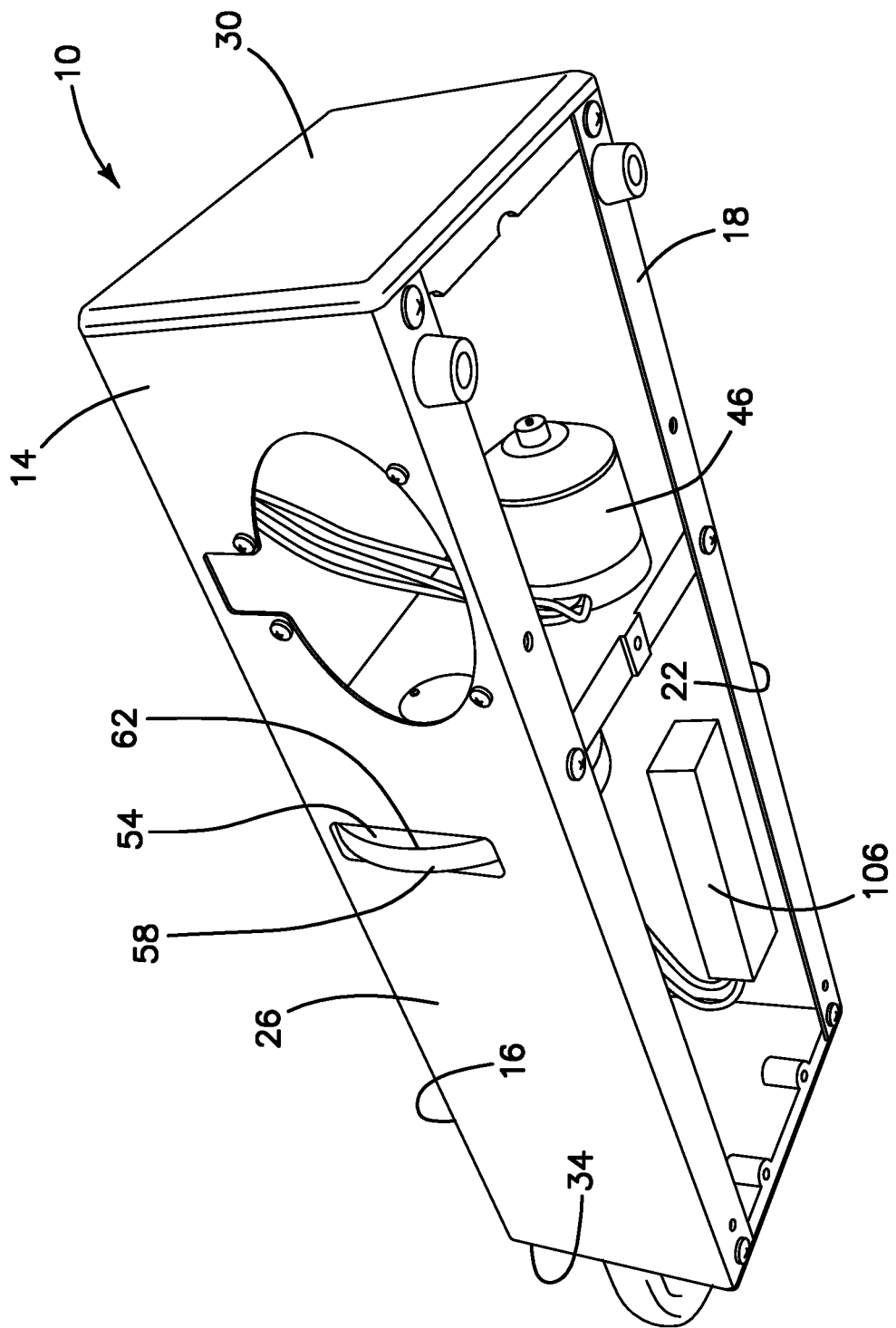
FIG. 2 is a bottom side perspective view of the FIG. 1 embodiment.

A first set of positioning hardware 82 is provided. The first set of positioning hardware 82 is sized, shaped and located to engage chassis components 86 adjacent a first end 88 of a small scale road racing or off-road fuel powered vehicle 90. The first set of positioning hardware is adjustable in a horizontal plane 42 so as to align an engine flywheel 94 of the vehicle 90 with the drive wheel 54.

A second set of positioning hardware 84 is provided. The second set of positioning hardware 84 is sized, shaped and located to engage chassis components adjacent a second end 92 of the small scale road racing or off-road fuel powered vehicle 90. The second set of positioning hardware 84 is adjustable in the horizontal plane 42 so as to align the engine flywheel 94 of the vehicle 90 with the drive wheel 54. As illustrated in FIGS. 3, 4 and 7-9, the second set of positioning hardware 84 is movable in a vertical plane 96, is maintained in an upper position 66 by at least one spring 70 and is movable to a lower position 78 when subject to pressure from above. The pressure causes the drive wheel 54 to engage the flywheel 94.

A momentary switch 98 is provided. The momentary switch 98 is closed when the second sets of positioning hardware 84 is moved to the lower position 78. An electronic speed control (ESC) is provided 102. The ESC 102 is located within the container 14 and electrically connected to the motor 46 and the momentary switch 98. A battery power source 106 is provided. The power source 106 is electrically connected directly or indirectly to the ESC 102 and the momentary switch 98.

Figure 3:
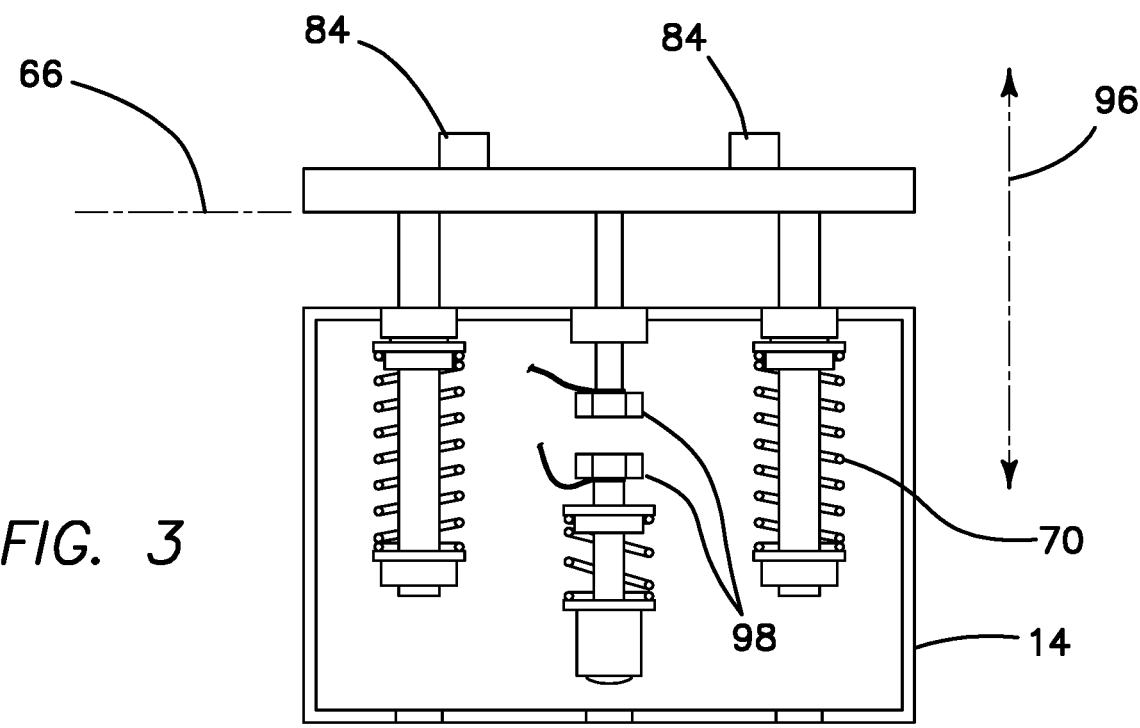
FIG. 3 is a side elevational view of the at least one spring controlling the momentary switch with the switch in the open position.
Figure 4:
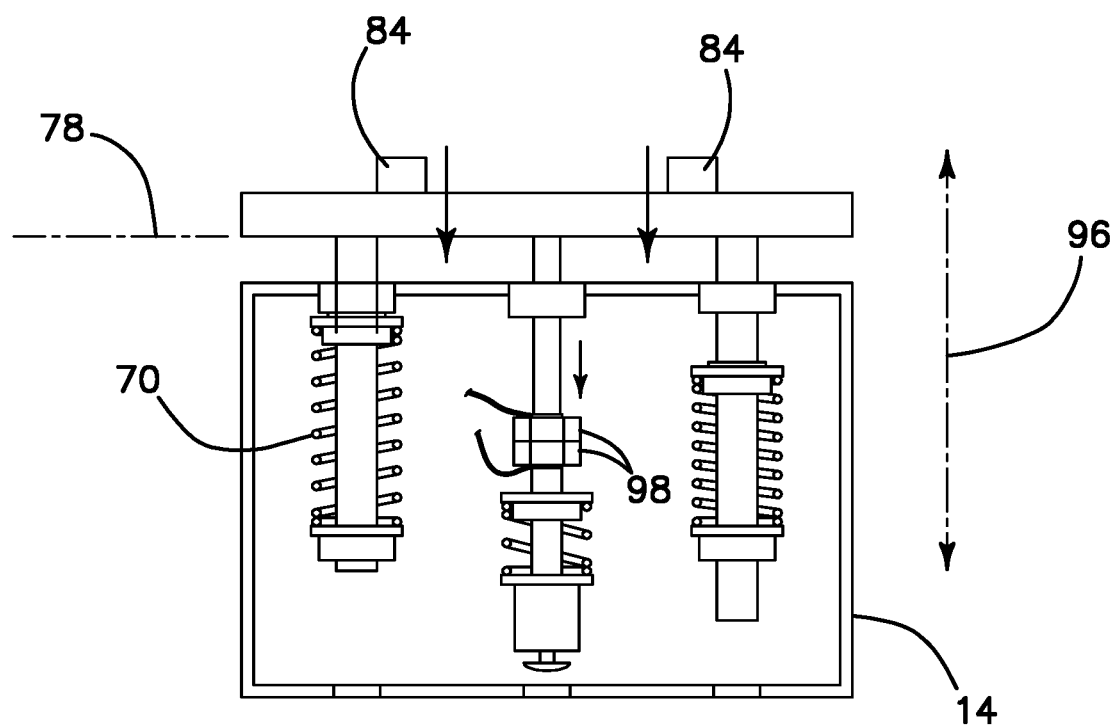
FIG. 4 is a side elevational view of the at least one spring controlling the momentary switch with the switch in the closed position.
Figure 3A:
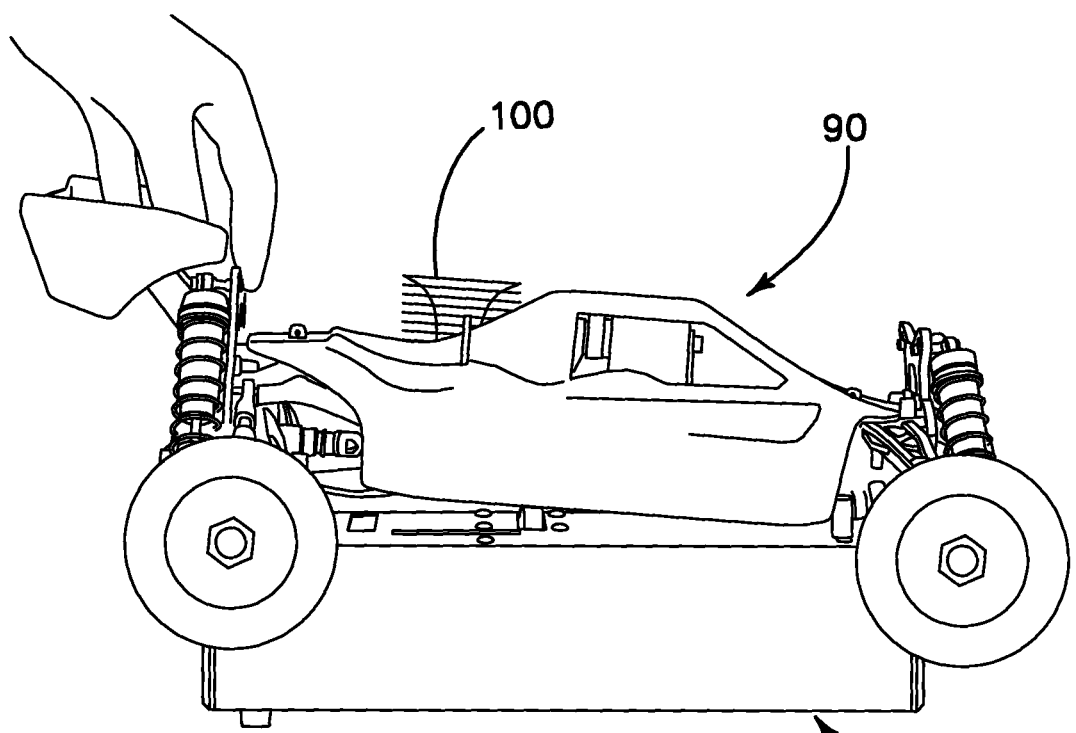
FIG. 3A is a side elevational view of the FIG. 1 embodiment with a small scale road racing or off-road fuel powered vehicle positioned above it and the momentary switch in the open position.
Figure 4A:
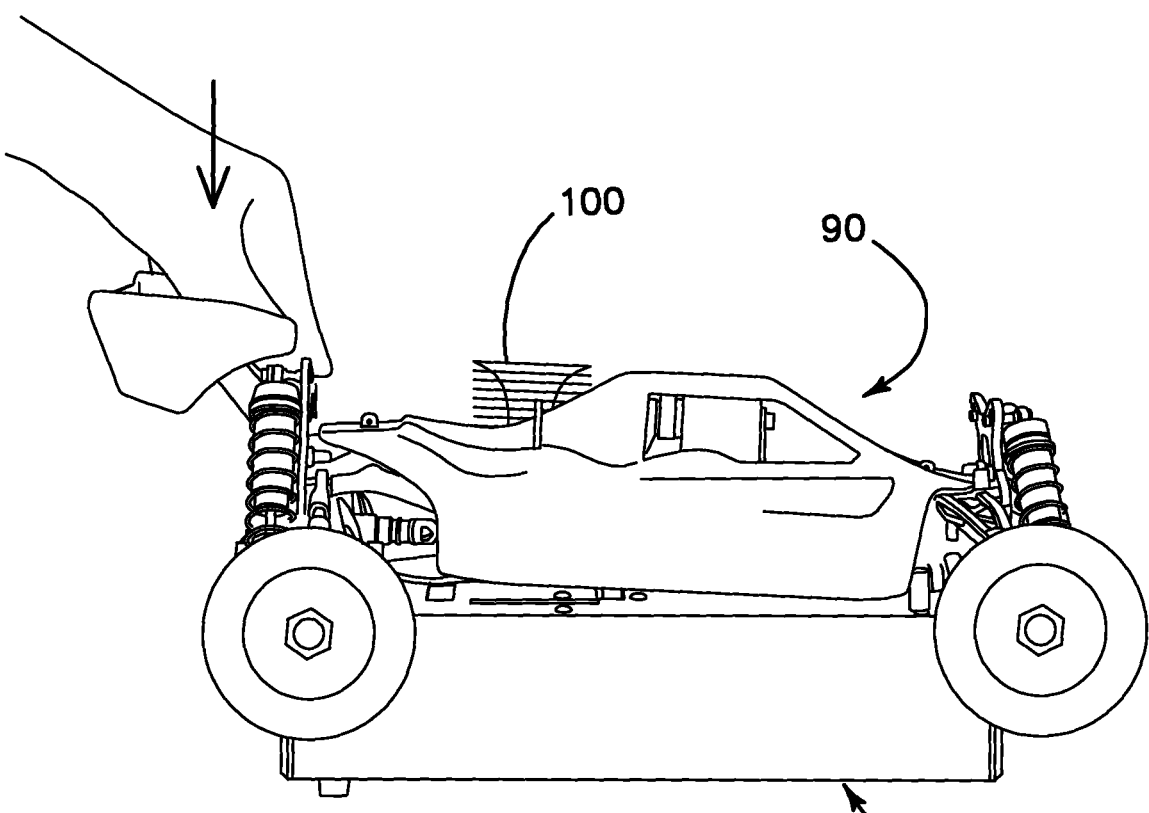
FIG. 4A is a side elevational view of the FIG. 1 embodiment with a small scale road racing or off-road fuel powered vehicle being pushed downwardly on the starter box and the momentary switch moving to the closed position.
Figure 6:
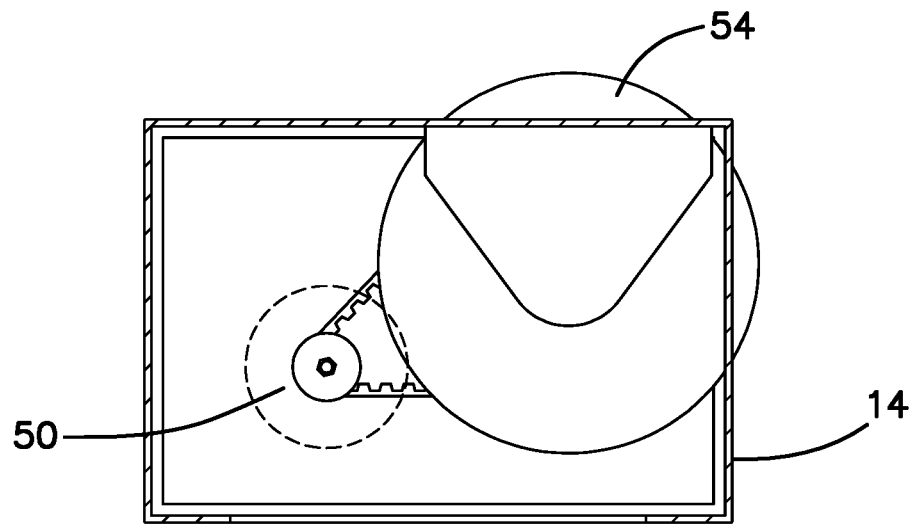
FIG. 6 is a cutaway end view of the FIG. 1 embodiment illustrating the drive wheel assembly and drive wheel positioned within the starter box.

As illustrated in FIGS. 3A and 4A, in operation, the small scale road racing or off-road fuel powered vehicle 90 is placed on the top panel 42 with the chassis components 86 engaged with the first 82 and second 86 sets of positioning hardware. The vehicle 90 is pressed downwardly causing the drive wheel to engage the vehicle flywheel 94. When the momentary switch 98 is closed, the brushless motor 46 will be activated by the power source 106 and the drive wheel 54 will cause the flywheel 94 to turn, thereby starting an engine 100 of the vehicle 90.

Figure 7:
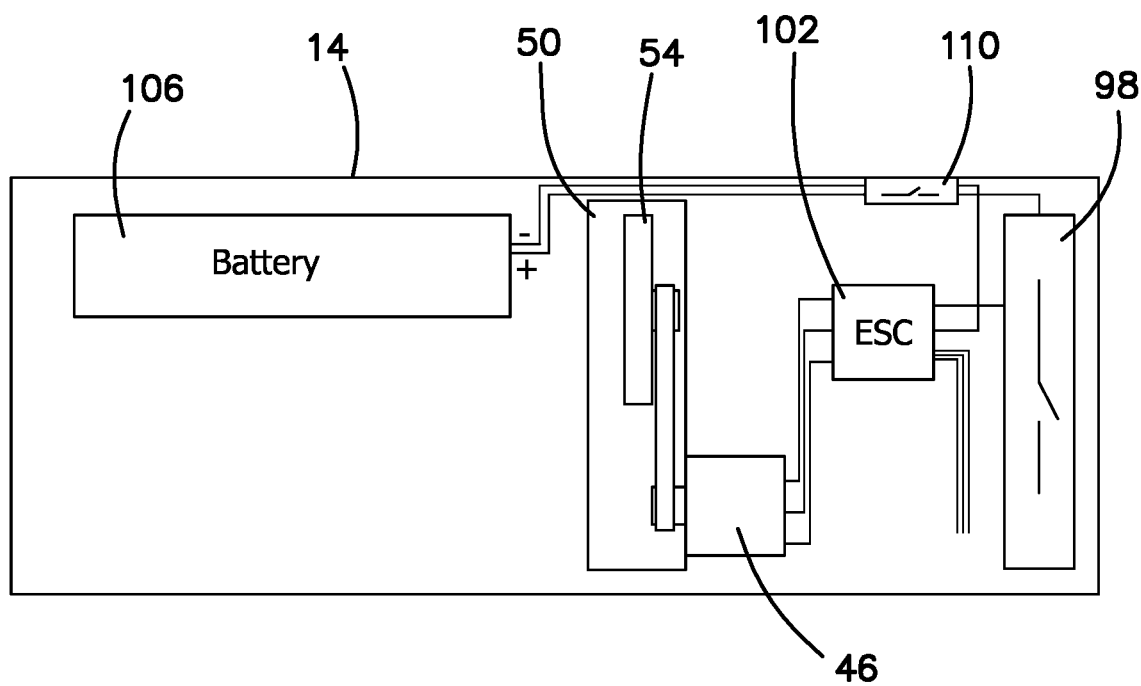
FIG. 7 is a top view of the FIG. 1 embodiment illustrating a first wiring arrangement for the battery power source, brushless motor, ESC, momentary switch and on/off switch.
Figure 8:
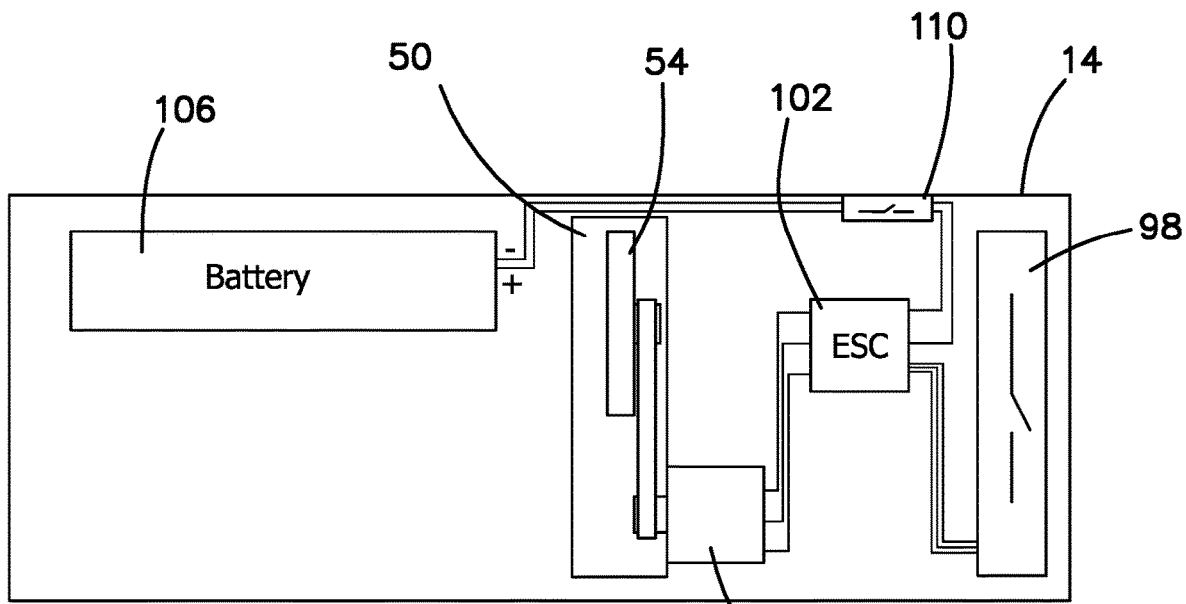
FIG. 8 is a top view of the FIG. 1 embodiment illustrating a second wiring arrangement for the battery power source, brushless motor, ESC, momentary switch and on/off switch.
Figure 9:
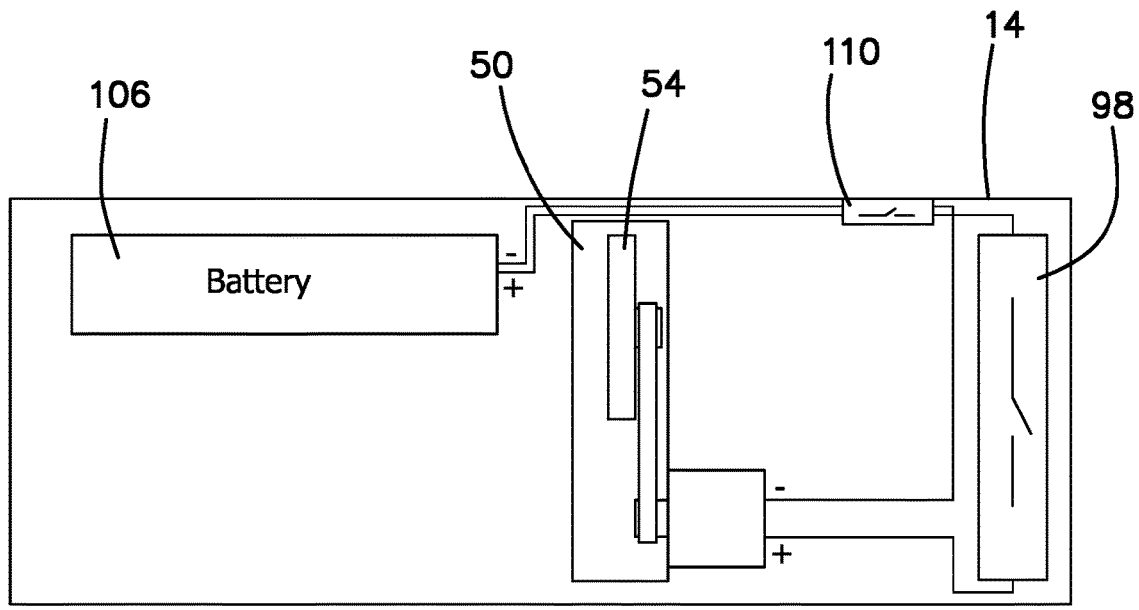
FIG. 9 is a top view of a prior art starter box illustrating the wiring arrangement for the battery power source, brushed motor, momentary switch and on/off switch.

(2) In a variant of the invention, As illustrated in FIGS. 7 and 8, the brushless motor starter box 10 includes an on/off switch 110 between the battery power source 106 and the ESC 102.

(3) In another variant, the ESC 102 detects a low voltage condition in the battery power source 106 and prevents further use of the battery 106.

Figure 11:
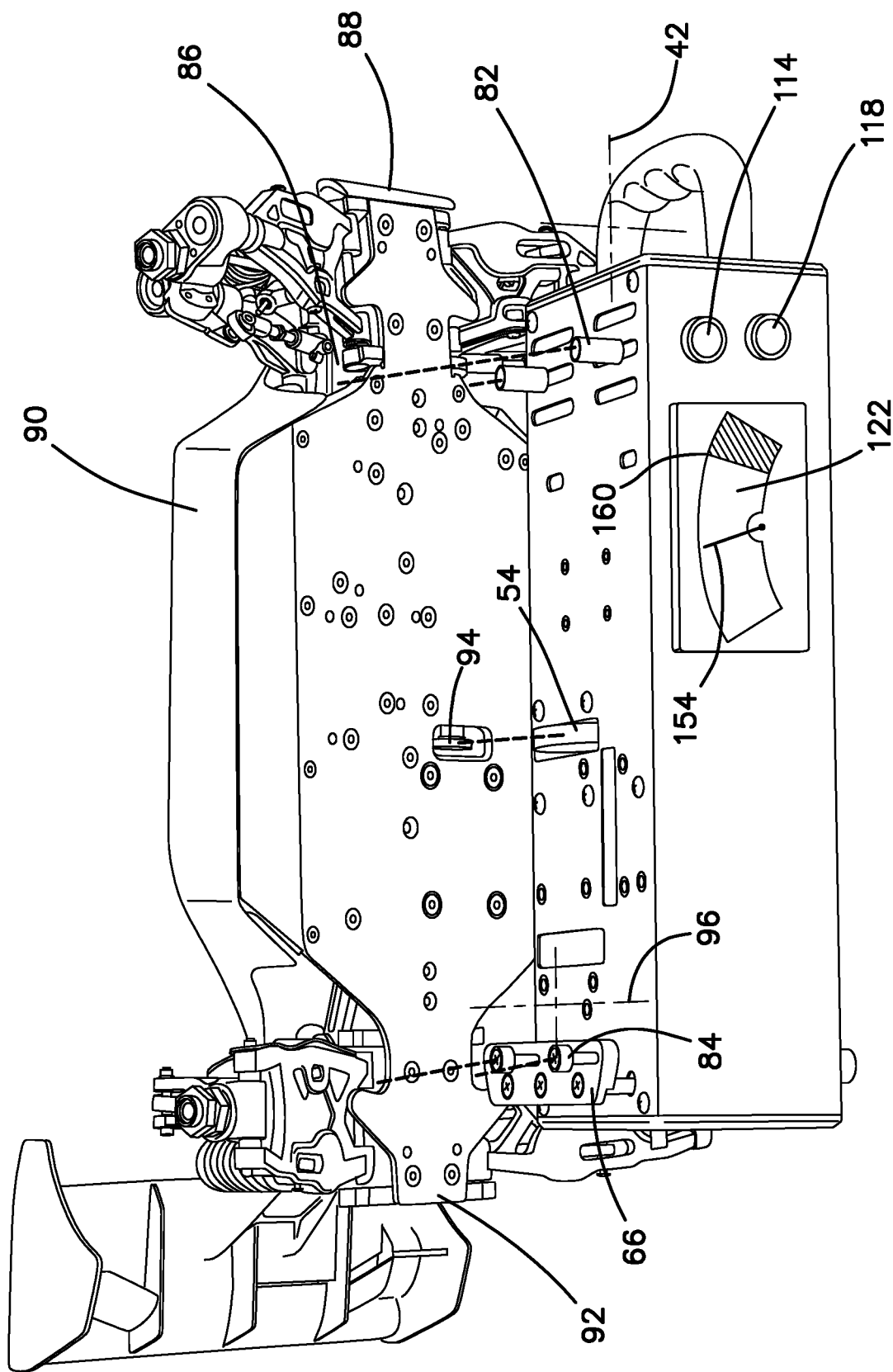
FIG. 11 is a perspective view of the FIG. 1 embodiment with a small scale road racing or off-road fuel powered vehicle positioned next to it to illustrate the fitting of the positioning hardware to the undersurface of the vehicle and to illustrate the low battery voltage indicator light, excessive battery voltage indicator light and the battery voltage indicator gauge.

(4) In still another variant, as illustrated in FIG. 11, the ESC 102 can measure voltage of the battery power source 106 and discontinue operation if measured voltage 154 is above a pre-determined maximum level 160.

(5) In yet another variant, the brushless motor starter box 10 includes a low battery voltage indicator light 114.

(6) In a further variant, the brushless motor starter box 10 includes an excessive battery voltage indicator light 118.

(7) In still a further variant, the brushless motor starter box 10 includes a battery voltage indicator gauge 122.

(8) In yet a further variant, the ESC 102 is programmable to permit the brushless motor 46 to operate at selected amounts of throttle (not shown).

(9) In another variant of the invention, the selected amounts of throttle 126 are selected from the group consisting of: 0% to 25% (not shown), 0% to 50% (not shown), 0% to 75% (not shown), and 0% to 100% (not shown).

Figure 12:
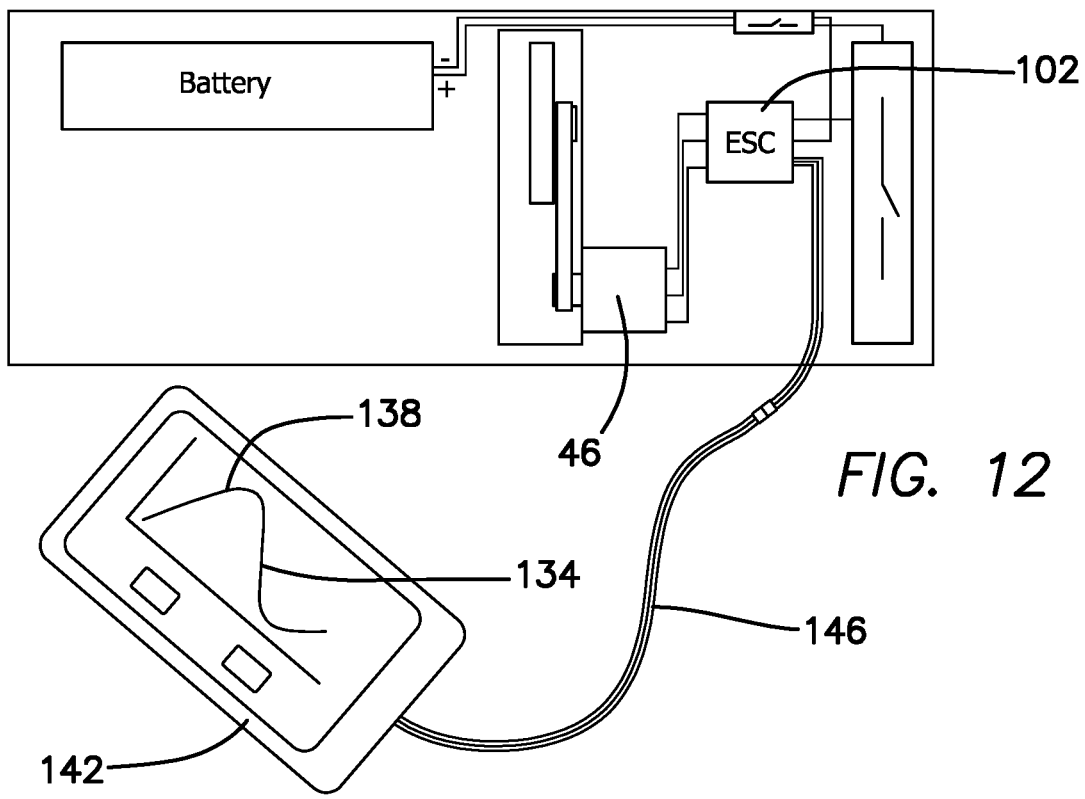
FIG. 12 is a plan view of the FIG. 1 embodiment with a wired external control unit illustrating a throttle response curve.
Figure 13:
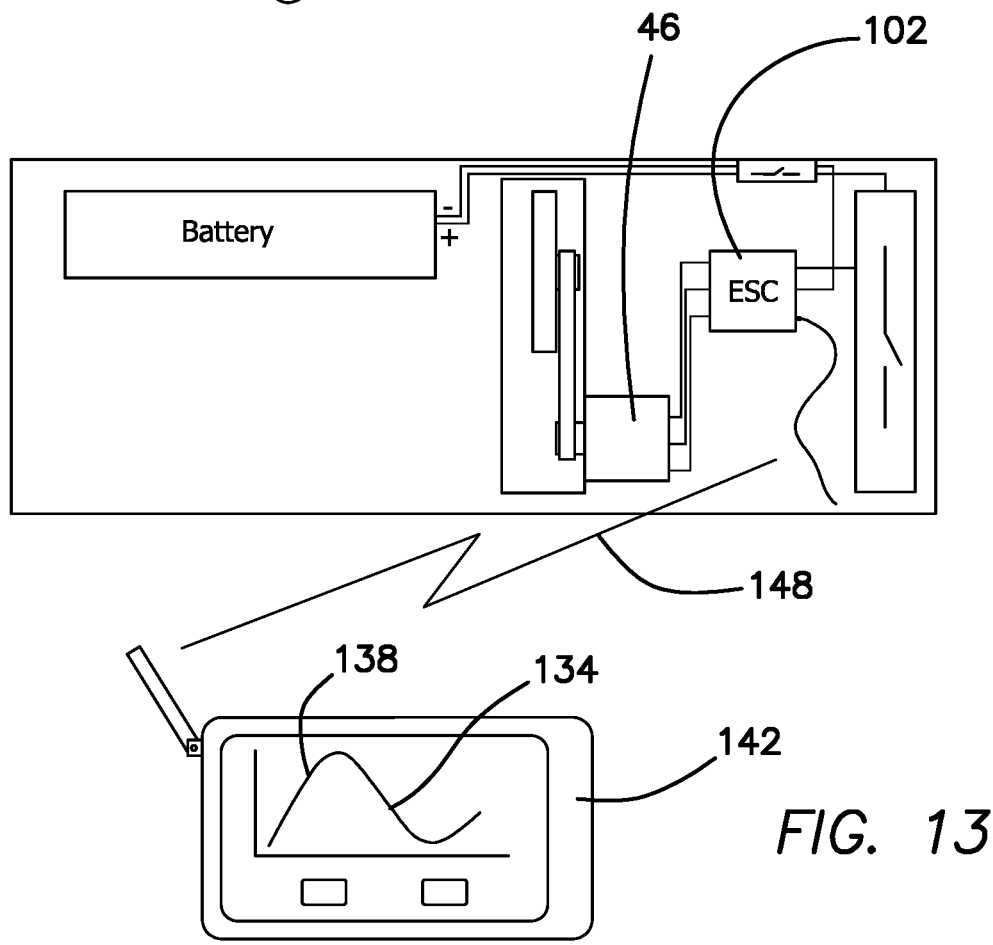
FIG. 13 is a plan view of the FIG. 1 embodiment with a wireless external control unit illustrating a throttle response curve.
Figure 14:
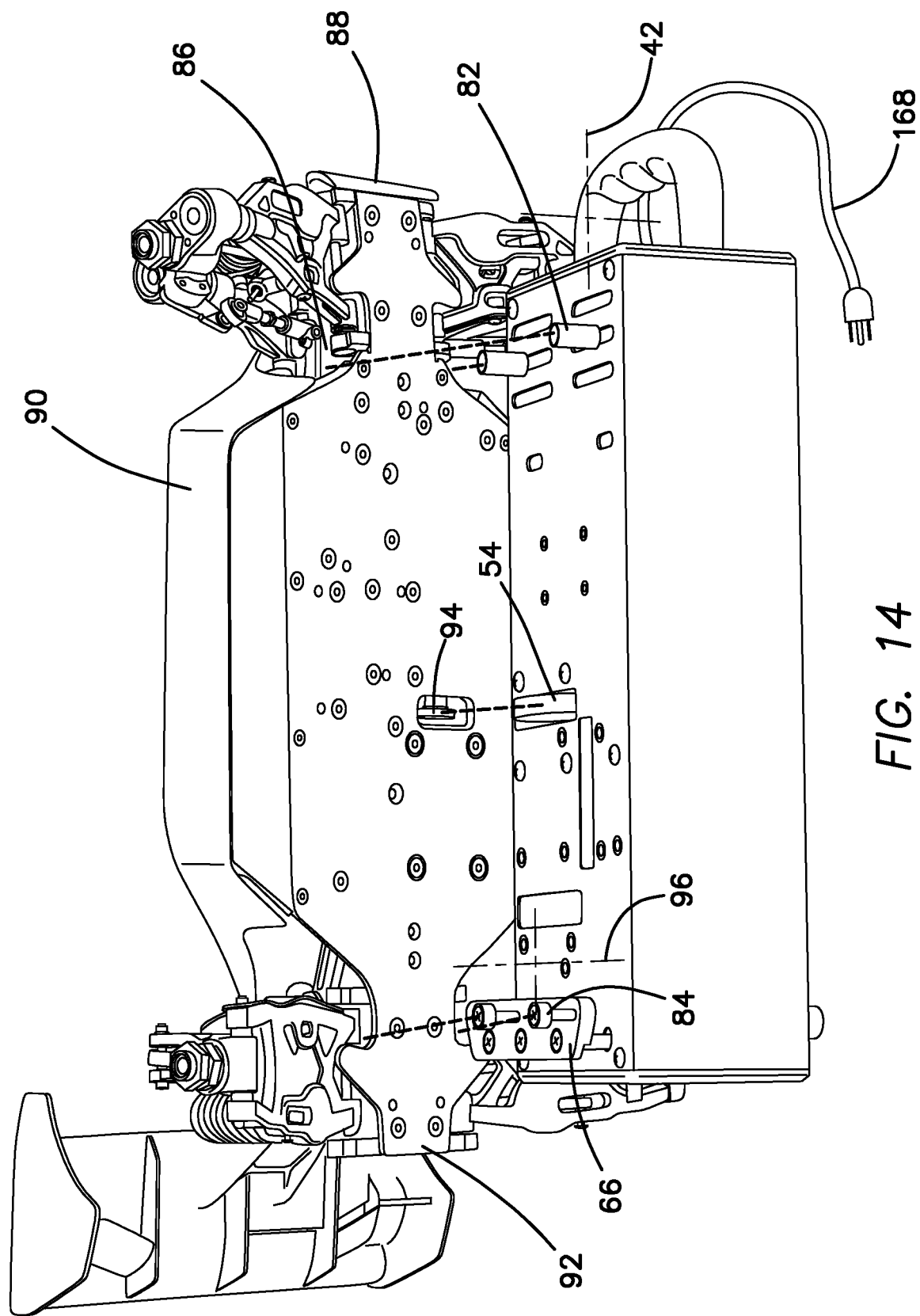
FIG. 14 is a perspective view of the brushed motor embodiment of the starter box with a small scale road racing or off-road fuel powered vehicle positioned next to it to illustrate the fitting of the positioning hardware to the undersurface of the vehicle and illustrating the external power source connection for the battery charger.
Figure 15:
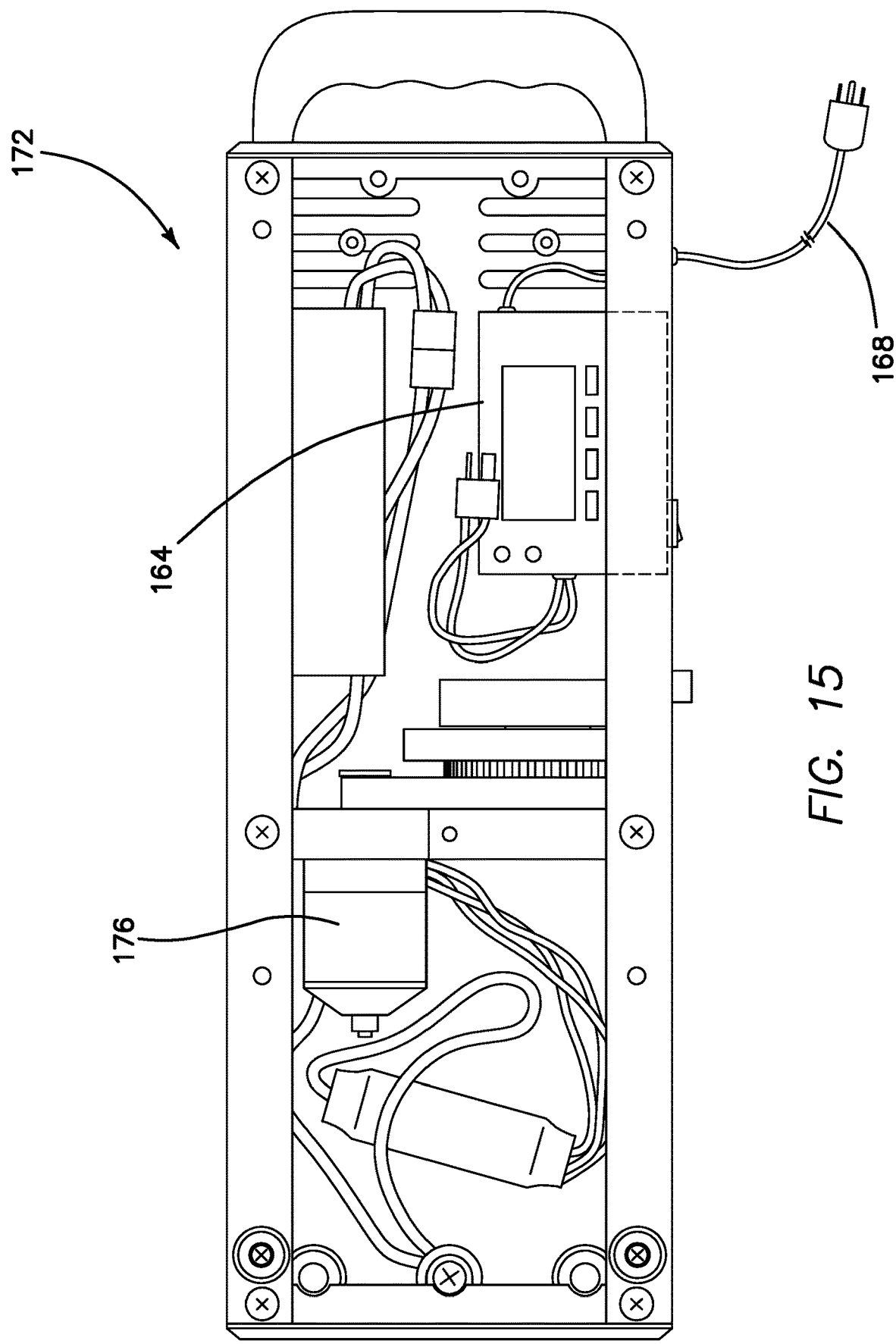
FIG. 15 is bottom view of the FIG. 14 embodiment illustrating a battery charging circuit and external power source connection.

(10) In still another variant, as illustrated in FIGS. 12 and 13, the ESC 102 is programmable to permit the brushless motor 46 to operate using selected throttle response curves 134.

(11) In yet another variant, the selected throttle response curves 134 are selected from the group consisting of: linear (not shown), hyperbolic 138, asymptotic (not shown), exponential (not shown).

(12) In a further variant, the ESC 102 is programmed using an external control unit 142, the external control unit 142 is connected to the ESC 102 using a wired connection 146.

(13) In still a further variant, the ESC 102 is programmed using an external control unit 142, the external control unit 142 is connected to the ESC 102 using a wireless connection 148.

(14) In yet a further variant, the ESC 102 is programmable to permit the brushless motor 46 to operate with a user-selected level of latency (not shown) for delayed starting after activation of the momentary switch 98.

(15) In another variant of the invention, as illustrated in FIG. 11, the ESC 102 is programmable to reduce battery voltage 154 found to be in excess of a pre-determined maximum level 160, thereby permitting continued operation of the brushless motor 46.

(16) In still another variant, the ESC 102 is not programmable.

Figure 10:
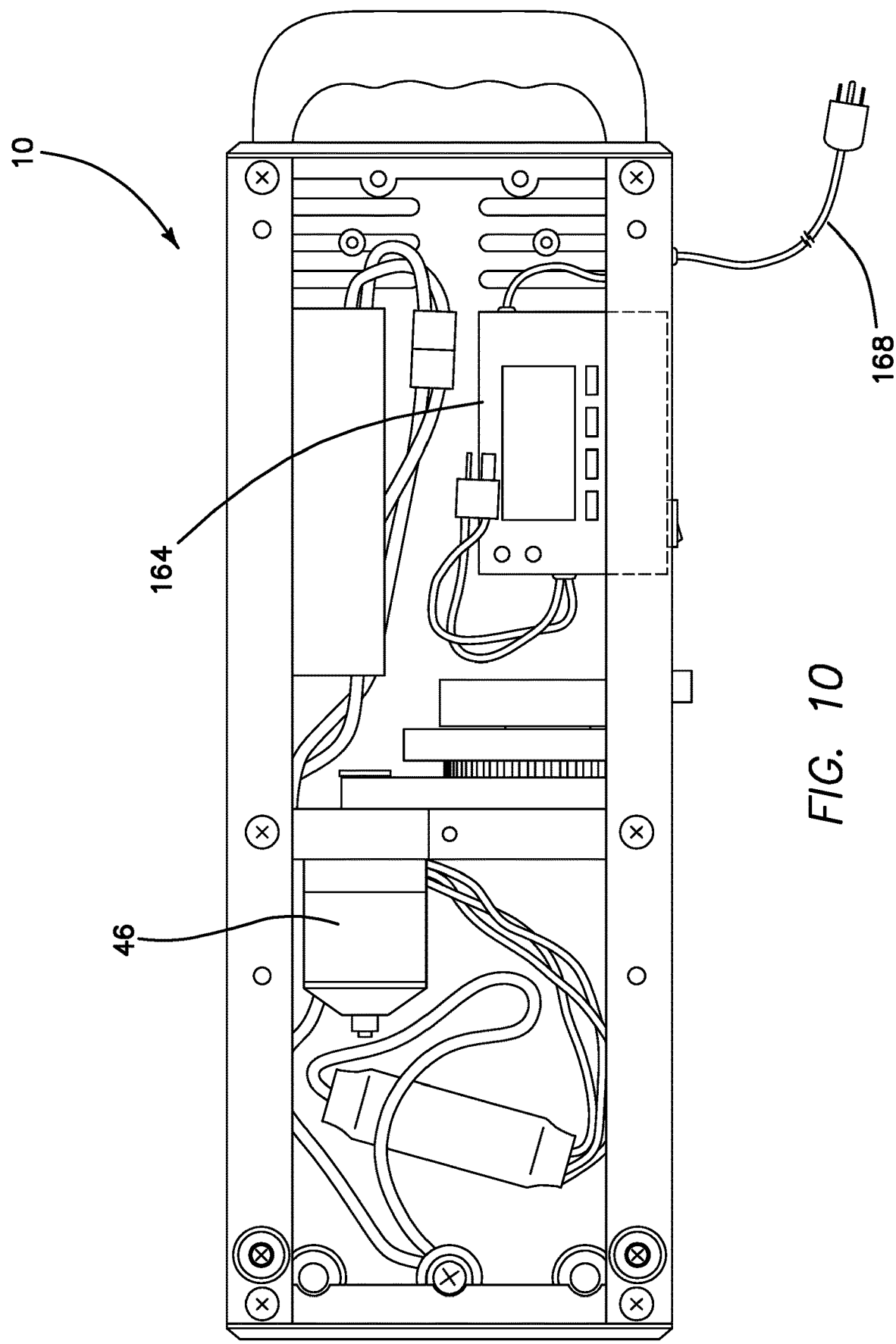
FIG. 10 is a bottom view of the FIG. 1 embodiment illustrating a battery charging circuit and external power source connection.

(17) In yet another variant, as illustrated in FIG. 10, the brushless motor starter box 10 includes a battery charging circuit 164 and external power source connection 168.

(18) In a final variant, a brushed motor starter box 172 can be constructed from the following components. As illustrated in FIGS. 1, 3, 3A, 4, 4A, 6, 14 and 15, rigid container 14 is provided. The container 14 has a top panel 16, a bottom panel 18, first 22 and second 26 side panels and first 30 and second 34 end panels. At least one brushed electrical motor 176 is provided. The at least one motor 176 is mounted to the container 14. A drive wheel assembly 50 is provided. The drive wheel assembly 50 is mounted in a fixed position with respect to the container 14 and has a drive wheel 54. The drive wheel 54 is mechanically connected to the motor 46 and has frictional material 58 located along an outer perimeter 62. The top panel 16 has an opening 74. The opening 74 is sized, shaped and located to permit a portion of the drive wheel 54 to project through the opening 74.

A first set of positioning hardware 82 is provided. The first set of positioning hardware 82 is sized, shaped and located to engage chassis components 86 adjacent a first end 88 of a small scale road racing or off-road fuel powered vehicle 90. The first set of positioning hardware is adjustable in a horizontal plane 42 so as to align an engine flywheel 94 of the vehicle 90 with the drive wheel 54.

A second set of positioning hardware 84 is provided. The second set of positioning hardware 84 is sized, shaped and located to engage chassis components adjacent a second end 92 of the small scale road racing or off-road fuel powered vehicle 90. The second set of positioning hardware 84 is adjustable in the horizontal plane 42 so as to align the engine flywheel 94 of the vehicle 90 with the drive wheel 54. As illustrated in FIGS. 3, 4 and 11, the second set of positioning hardware 84 is movable in a vertical plane 96, is maintained in an upper position 66 by at least one spring 70 and is movable to a lower position 78 when subject to pressure from above. The pressure causes the drive wheel 54 to engage the flywheel 94.

A momentary switch 98 is provided. The momentary switch 98 is closed when the second sets of positioning hardware 84 is moved to the lower position 78. A battery power source 106 is provided. The power source 106 is electrically connected directly or indirectly to the motor 176 and the momentary switch 98. A battery charging circuit 164 and external power source connection 168 is provided. The battery charging circuit 164 is connectable to the battery power source 106.

As illustrated in FIGS. 3A and 4A, in operation, the small scale road racing or off-road fuel powered vehicle 90 is placed on the top panel 42 with the chassis components 86 engaged with the first 82 and second 86 sets of positioning hardware. The vehicle 90 is pressed downwardly causing the drive wheel to engage the vehicle flywheel 94. When the momentary switch 98 is closed, the brushed motor 176 will be activated by the power source 106 and the drive wheel 54 will cause the flywheel 94 to turn, thereby starting an engine 100 of the vehicle 90.

The brushless motor starter box 10, has been described with reference to particular embodiments. Other modifications and enhancements can be made without departing from the spirit and scope of the invention.

The invention claimed is:

1. A brushless motor starter box comprising:
a rigid container, said container having a top panel, bottom panel, first and second side panels and first and second end panels;
at least one brushless electrical motor, said at least one motor being mounted to said container;
a drive wheel assembly, said drive wheel assembly being mounted in a fixed position with respect to said container and having a drive wheel, said drive wheel being mechanically connected to said motor and having frictional material disposed along an outer perimeter;
said top panel having an opening, said opening being sized, shaped and disposed to permit a portion of said drive wheel to project through said opening;
a first set of positioning hardware, said first set of positioning hardware being sized, shaped and disposed to engage chassis components adjacent a first end of a small scale road racing or off-road fuel powered vehicle and being adjustable in a horizontal plane so as to align an engine flywheel of said vehicle with said drive wheel;
a second set of positioning hardware, said second set of positioning hardware being sized, shaped and disposed to engage chassis components adjacent a second end of said small scale road racing or off-road fuel powered vehicle and being adjustable in said horizontal plane so as to align said engine flywheel of said vehicle with said drive wheel;
said second set of positioning hardware being movable in a vertical plane, being maintained in an upper position by at least one spring and being movable to a lower position when subject to pressure from above, said pressure causing said drive wheel to engage said flywheel;
a momentary switch, said momentary switch being closed when said said second set of positioning hardware is moved to said lower position;
an electronic speed control (ESC), said ESC being disposed within said container and electrically connected to said motor and said momentary switch;
a battery power source, said power source being electrically connected directly or indirectly to said ESC and said momentary switch; and
wherein, when said small scale road racing or off-road fuel powered vehicle is placed on said top panel with said chassis components engaged with said first and second sets of positioning hardware, said vehicle pressed downwardly causing said drive wheel to engage said flywheel, and said momentary switch is closed, said brushless motor will be activated by said power source and said drive wheel will cause said flywheel to turn, thereby starting said an engine of said vehicle.

2. The brushless motor starter box of claim 1, further comprising an on/off switch between the battery power source and the ESC.

3. The brushless motor starter box of claim 1, wherein said ESC detects a low voltage condition in said battery power source and prevent further use of the battery.

4. The brushless motor starter box of claim 3, further comprising a low battery voltage indicator light.

5. The brushless motor starter box of claim 1, wherein said ESC can measure voltage of said battery power source and discontinue operation if measured voltage is above a pre-determined maximum level.

6. The brushless motor starter box of claim 5, further comprising an excessive battery voltage indicator light.

7. The brushless motor starter box of claim 6, wherein said ESC is programmable to reduce battery voltage found to be in excess of a pre-determined maximum level, thereby permitting continued operation of said brushless motor.

8. The brushless motor starter box of claim 1, further comprising a battery voltage indicator gauge.

9. The brushless motor starter box of claim 8, wherein said selected amounts of throttle are selected from the group consisting of:
0% to 25%, 0% to 50%, 0% to 75%, and 0% to 100%.

10. The brushless motor starter box of claim 1, wherein said ESC is programmable to permit said brushless motor to operate at selected amounts of throttle.

11. The brushless motor starter box of claim 1, wherein said ESC is programmable to permit said brushless motor to operate using selected throttle response curves.

12. The brushless motor starter box of claim 11, wherein said selected throttle response curves are selected from the group consisting of:
linear, hyperbolic, asymptotic and exponential.

13. The brushless motor starter box of claim 1, said ESC is programmed using an external control unit, said external control unit being connected to said ESC using a wired connection.

14. The brushless motor starter box of claim 1, wherein said ESC is programmed using an external control unit, said external control unit being connected to said ESC using a wireless connection.

15. The brushless motor starter box of claim 1, wherein said ESC is programmable to permit said brushless motor to operate with a user-selected level of latency for delayed starting after activation of said momentary switch.

16. The brushless motor starter box of claim 1, wherein said ESC is not programmable.

17. The brushless motor starter box of claim 1, further comprising a battery charging circuit and external power source connection.

18. A brushed motor starter box comprising:
a rigid container, said container having a top panel, bottom panel, first and second side panels and first and second end panels;
at least one brushed electrical motor, said at least one motor being mounted to said container;
a drive wheel assembly, said drive wheel assembly being mounted in a fixed position with respect to said container and having a drive wheel, said drive wheel being mechanically connected to said motor and having frictional material disposed along an outer perimeter;
said top panel having an opening, said opening being sized, shaped and disposed to permit a portion of said drive wheel to project through said opening;
a first set of positioning hardware, said first set of positioning hardware being sized, shaped and disposed to engage chassis components adjacent a first end of a small scale road racing or off-road fuel powered vehicle and being adjustable in a horizontal plane so as to align an engine flywheel of said vehicle with said drive wheel;
a second set of positioning hardware, said second set of positioning hardware being sized, shaped and disposed to engage chassis components adjacent a second end of said small scale road racing or off-road fuel powered vehicle and being adjustable in said horizontal plane so as to align said engine flywheel of said vehicle with said drive wheel;
said second set of positioning hardware being movable in a vertical plane, being maintained in an upper position by at least one spring and being movable to a lower position when subject to pressure from above, said pressure causing said drive wheel to engage said flywheel;
a momentary switch, said momentary switch being closed when said said second set of positioning hardware is moved to said lower position;
a battery power source, said power source being electrically connected directly or indirectly to said brushed motor and said momentary switch;
a battery charging circuit and external power source connection, said battery charging circuit being connectable to said battery power source; and
wherein, when said small scale road racing or off-road fuel powered vehicle is placed on said top panel with said chassis components engaged with said first and second sets of positioning hardware, said vehicle pressed downwardly causing said drive wheel to engage said flywheel, and said momentary switch is closed, said brushless motor will be activated by said power source and said drive wheel will cause said flywheel to turn, thereby starting said an engine of said vehicle.

* * * * *